United States Patent
Vasudevan et al.

(10) Patent No.: US 7,548,760 B2
(45) Date of Patent: Jun. 16, 2009

(54) METHOD OF REVERSE LINK DYNAMIC POWER CONTROL IN A WIRELESS COMMUNICATION SYSTEM USING QUALITY FEEDBACK FROM A DELAY-SENSITIVE TRAFFIC STREAM OR OVERHEAD CHANNEL

(75) Inventors: Subramanian Vasudevan, Morristown, NJ (US); Jialin Zou, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 686 days.

(21) Appl. No.: 11/331,994

(22) Filed: Jan. 13, 2006

(65) Prior Publication Data

US 2007/0167183 A1    Jul. 19, 2007

(51) Int. Cl.
*H04Q 7/20* (2006.01)

(52) U.S. Cl. ............... 455/522; 455/69; 455/68; 455/500; 455/517; 455/127.1; 714/746; 714/748; 714/749

(58) Field of Classification Search ............... 455/522, 455/69, 68, 127.1, 500, 517, 67.11, 67.13, 455/422.1, 403, 412.1, 412.2, 550.1, 414.1, 455/414.2, 414.3, 466; 370/493, 494, 495, 370/480, 310, 343; 714/746, 747, 748, 749, 714/750, 751

See application file for complete search history.

(56) References Cited

U.S. PATENT DOCUMENTS

| | | | |
|---|---|---|---|
| 6,996,763 B2 * | 2/2006 | Sarkar et al. | 714/749 |
| 7,350,125 B2 * | 3/2008 | Jang et al. | 714/748 |
| 2007/0150788 A1 * | 6/2007 | Zhuyan | 714/749 |

FOREIGN PATENT DOCUMENTS

| | | | |
|---|---|---|---|
| EP | 1 168 703 A | | 1/2002 |
| EP | 1 551 112 A | | 7/2005 |
| WO | WO 2005/011145 A | | 2/2005 |
| WO | WO 2005/048640 A | | 5/2005 |
| WO | PCT/US2007/000720 | | 6/2007 |

* cited by examiner

*Primary Examiner*—Keith T Ferguson

(57) ABSTRACT

A closed loop power control based on receiving a continuous quality feedback is described. A main reverse link (RL) pilot is controlled by the quality feedback of a substantially continuous delay-sensitive traffic stream, such as Voice-over-IP (VoIP), when such a stream is enabled. When such a stream is not enabled, the quality of a continuous RL overhead channel is used to control the pilot power. At the same time, the Traffic-to-Pilot Ratios (TPR) of contemporaneously transmitted delay-sensitive data streams are independently adjusted based on a quality feedback associated with each such data stream.

19 Claims, 6 Drawing Sheets

METHOD OF REVERSE LINK DYNAMIC POWER CONTROL IN A WIRELESS COMMUNICATION SYSTEM USING QUALITY FEEDBACK FROM A DELAY-SENSITIVE TRAFFIC STREAM OR OVERHEAD CHANNEL

CROSS REFERENCE TO RELATED APPLICATIONS

This application describes and claims subject matter that is also described in co-pending United States patent applications filed simultaneously herewith and entitled Method of Reverse Link Dynamic Power Control in a Wireless Communication System Using Per-Flow Quality Feedback for Multi-Flow Data Traffic, Ser. No. 11/331,994.

TECHNICAL FIELD

This invention relates to wireless communications.

BACKGROUND OF THE INVENTION

In conventional CDMA systems, intra-cell interference contributes to the major portion of the total interference in the Reverse Link (RL). Tight (fast) RL power control with dedicated power-control sub-channels are required to ensure a proper signal-to-noise (SNR) level of a mobile terminal and to minimize its interference to other users due to the well-known near-far problem.

In currently existing 3G CDMA systems, in order to minimize intra-cell interference, the fundamental power control (PC) mechanism involves two control loops, an inner loop and an outer loop, which have been inherited from 2G systems for circuit voice applications. FIG. 1 shows these conventional prior art power control loops that exist between a mobile Access Terminal (AT) 101, a Base Transceiver Station (BTS) 102, and a Radio Network Controller (RNC) 103. Fast power control is conducted by the inner loop that includes, within AT 101, a pilot power adjuster 104, and within BTS 102, a pilot measurer 105, which measures the power of the pilot received on the reverse link (RL) from AT 101, a pilot versus set point comparator 106, which generates power control bits (PCBs) based on comparisons of the measured pilot power against a target (set point), and a PCB transmitter 107, which transmits the PCBs generated by comparator 106 over the forward link (FL) to the pilot power adjuster 104 in AT 101. The power of the pilot transmitted by AT 101 is dynamically adjusted in response to the PCBs received from BTS 102, as is the power of the traffic channel (circuit voice), which is adjusted in response to the traffic power adjuster 108. The latter, dynamically adjusts its traffic output power according to the pilot power so as to maintain a fixed Traffic-to-Pilot Ratio (TPR), the latter being a fixed parameter that is inputted to adjuster 108. Since AT 101, which transmits circuit voice, does not receive quality feedback from BTS 102 (e.g., an ACK/NAK) (as in the case in CDMA2000 1x and EVDV), the power control set point used by comparator 106 is dynamically adjusted by the outer loop. The outer loop includes traffic power adjuster 108 within AT 101, traffic demodulator 109 and decoder 110 within BTS 102, and set point adjuster 111 within RNC 103. Specifically, the voice traffic received by BTS 102 is demodulated by demodulator 109 and is decoded by decoder 110. A cyclic redundancy check (CRC) is calculated by decoder 110 for each received and decoded digital voice frame, where the calculated CRC indicates whether a received frame has been decoded properly and "passes", or is in error and "fails". The pass/fail indications of the successive CRC calculations are outputted by decoder 110 and inputted to set point adjuster 111. Based on these pass/fail indications and a targeted frame error rate (FER), set point adjuster 111 dynamically adjusts the set point with which comparator 106 compares the measured received pilot. The AT pilot transmission power is thus dynamically controlled by the generated power control bits such that the received pilot at BTS 102 tracks the pilot set point.

For 3G CDMA systems supporting burst data services, some power control enhancements are disclosed in various co-pending patent applications. For example: in Ser. No. 10/924,268, filed Aug. 23, 2004, ACKs/NAKs are used to adjust the TPR of the burst data traffic without increasing any overhead; in Ser. No. 10/798,166, filed Mar. 11, 2004, a pilot frame error rate is used in the outer loop to determine the PC target of the fast inner loop when no voice traffic is available; and in Ser. No. 10/954,755 filed Sep. 30, 2004, a Channel Quality Indicator (CQI) erasure metric is used in the outer loop to determine the PC target of the fast inner loop when voice traffic is unavailable.

The above-described prior art mechanism involving inner and outer control loops is complicated and not really effective and efficient for systems with multi-flow applications including conversational streaming and burst types of traffic.

Unlike conventional CDMA systems where intra-cell interference contributes to the major portion of the total interference in the RL, in the new air interface proposed to CDMA2000 Revision C (RevC) standard, such as OFDMA (Orthogonal Frequency Division Multiple Access) and CDMA with Interference Cancellation (IC), intra-cell interference is not the major factor of concern for power control. In the RL of an OFDMA system, intra-cell interference is minimal while in the RL of a CDMA system with IC, intra-cell interference is progressively cancelled and, in fact, the receiving power difference among different ATs may aid the IC process. As tight a power control as is required in existing CDMA systems is thus not needed in the newer CDMA and OFDMA RevC systems. On the other hand, however, in a CDMA system with IC, the ATs whose RL signals are decoded earlier will still be impacted more by the intra-cell interference. Further, there is still inter-cell interference for both CDMA with IC and OFDMA systems. Thus, in order to maintain a sufficient signal-to-noise ratio (SNR), power control is still needed. In addition, in a new RevC system, inter-cell interference is also an important factor that needs to be considered for power control. An AT at a cell edge will need to be restricted on its transmission power based on its neighbor cell's tolerance on inter-cell interference.

A simpler power control mechanism is thus needed for new RevC CDMA and OFDMA systems where as tight control as is presently being used in conventional systems is not required.

SUMMARY OF THE INVENTION

Embodiments of the present invention make use of the fact that new systems, such as the new RevC system, are purely packet-based that use feedback to indicate to a transmitter whether a packet has or has not been received correctly. In the RL, such Hybrid Automatic Request (HARQ) systems provide feedback that is sent from the BTS to the AT for each received and decoded packet via an ACK, which acknowledges receipt and positive receipt and decoding of the packet, or via a NAK, which indicates non-receipt or failed decoding of the packet. If a NAK is sent back, the packet is resent, and the process is repeated until either the packet is properly received and correctly decoded, or a maximum number of allowed transmissions have taken place. This feedback can thus be used as a measure of the quality of the signal being transmitted on the RL by the AT to the BTS and thus provide the AT with an indication of whether its main RL pilot power (and the corresponding transmission power levels of the data flows which are controlled by it) is sufficiently high or too low.

Embodiments of the present invention use a closed-loop dynamic power control that is based on receiving a quality feedback. As a result, the inner loop power control used by the prior art is removed. In addition the dedicated power control channel and power control bits are also eliminated. Further, the complicated RNC/BTS-based outer loop power control is also removed. Advantageously, embodiments that employ this closed-loop dynamic power control have significantly reduced overhead and complexity compared to the existing prior art power control mechanisms.

In an embodiment of the present invention, the main reference pilot transmitted by the AT on the RL and received at the BTS is maintained at the BTS at a stable and ideally constant level by means of a continuous quality indication that is fed back from the BTS to the AT over a quality feedback channel in the forward link. Specifically, using the already existing ACK/NAK feedback of the HARQ implementation, the main pilot transmission level is dynamically controlled at the AT to directly track a quality target of a delay-sensitive traffic stream that is being transmitted by the AT to the BTS such as, for example, a traffic stream carrying Voice-over-IP (VoIP) or Video Telephony (VT). Such a delay-sensitive traffic stream is transmitted essentially continuously by the AT, but, however, during periods when no delay-sensitive traffic stream is being transmitted by the AT, then the quality of an overhead channel that is constantly being transmitted by the AT and from which a quality metric can be derived by the BTS is instead fed back to the AT for power control purposes. In an embodiment, the overhead channel can be, for example, the Channel Quality Indicator (CQI) sent by AT to the BTS as an indicator of the quality of the pilot received by the AT from the BTS on the FL channel, or the Data Rate Control (DRC) sent by the AT to the BTS in 1xEVDO systems.

Thus, in an embodiment, the BTS transmits to the AT a continuous quality indications for dynamic power control at the AT, which quality indications are the ACKs/NAKs derived from the calculated CRC of the packets of the decoded received delay-sensitive traffic stream if such a stream is actively being received by the BTS from the AT, and which otherwise are the "good" and "bad" quality indications of the decoded words received by the BTS on an overhead channel (e.g., CQI) from the AT. Correspondingly, in an embodiment, the AT, when it is transmitting a delay-sensitive traffic flow, adjusts its transmit pilot power is up by a pre-determined step size if it receives an indication of a NAK from the BTS and adjusts its transmit pilot power down if it receives an indication of an ACK from the BTS, and if the AT is not transmitting a delay-sensitive traffic flow, adjusts its transmit pilot power up if it receives from the BTS a "bad" quality indication of the words received by the BTS on the overhead channel (e.g., CQI) from the AT, and adjusts its transmit pilot power down if it receives from the BTS a "good" quality indication.

In an embodiment, multiple non-delay-sensitive data flows transmitted from the AT to the BTS, such as bursts of data traffic, are individually power controlled based on receiving a quality feedback for each such flow from the ACKs and NAKs generated by the BTS and that are derived in each flow from the CRCs of the decoded received flow. While the transmit power of all the multiple data flows are being adjusted in accordance with the main pilot power, which itself is dynamically varying based on received quality indications as described above, individual quality feedbacks received for each data flow are used to dynamically adjust flow-specific target TPRs that are each based on the ACKs/NAKs generated at the BTS from decoded packets in the individual data flows. The transmit power of each data flow is thus separately determined by a varying main pilot power commonly applied to each of the data flows, and a varying flow-specific TPR. Thus, in an individual flow, when a NAK is received from the BTS, the AT adjusts the TPR for that flow up a predetermined step, and when an ACK is received, the AT adjusts the TPR for that flow down a predetermined step, with different flows possibly having different up and down step sizes.

In an embodiment, dynamic adjustment of the main pilot via ACK/NAK feedback from the delay-sensitive traffic stream or via a quality indicator of a continuously received RL overhead channel, and dynamic adjustment of the TPR for one or more data flows are coordinated so that multiple requests do not simultaneously effect an adjustment upward of both the pilot and a flow's TPR.

BRIEF DESCRIPTION OF THE DRAWING

The present invention will be better understood from reading the following description of non-limiting embodiments, with reference to the attached drawings, wherein below:

FIG. 3 is a set of timing diagrams that illustrate the relationships between a VoIP flow transmitted by an AT, the feedback quality indication channel received by the AT on the FL, the responsive main pilot level, and the CQI words transmitted by the AT;

DETAILED DESCRIPTION

Figure 1:
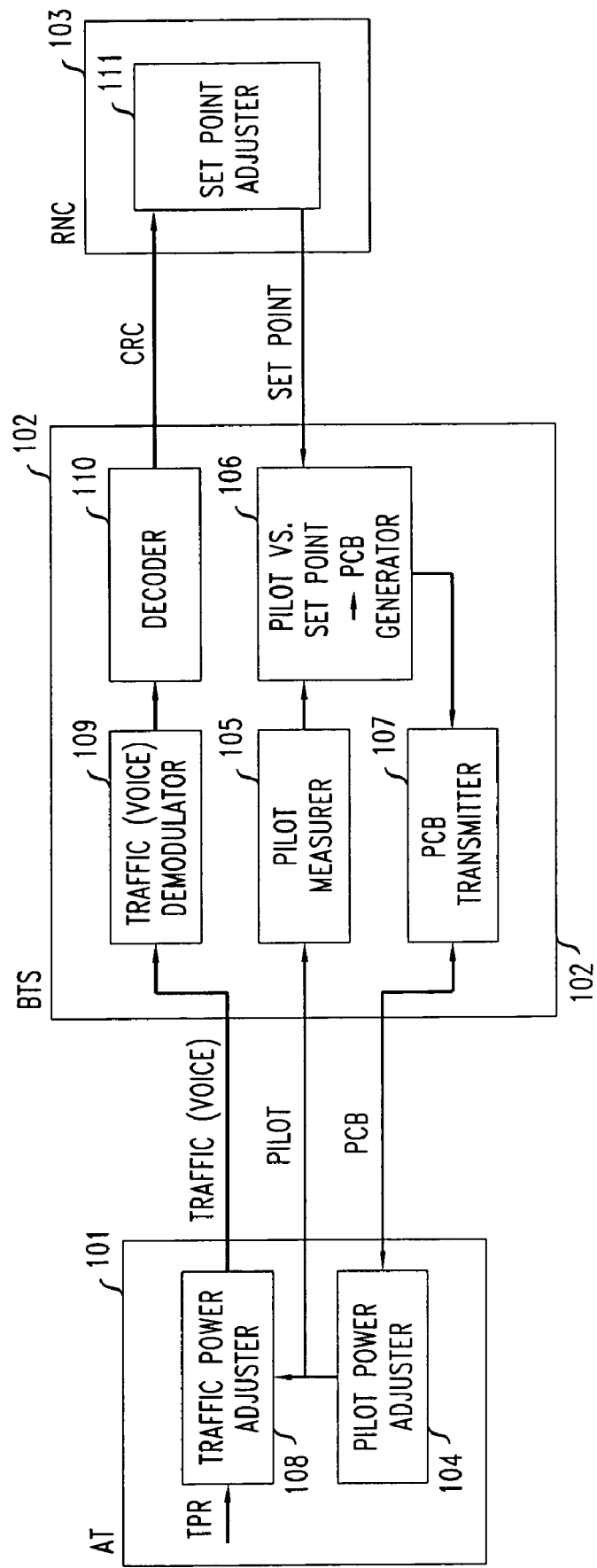
FIG. 1 is a block diagram of a prior art power control system having inner and outer loops, as described above.
Figure 2:
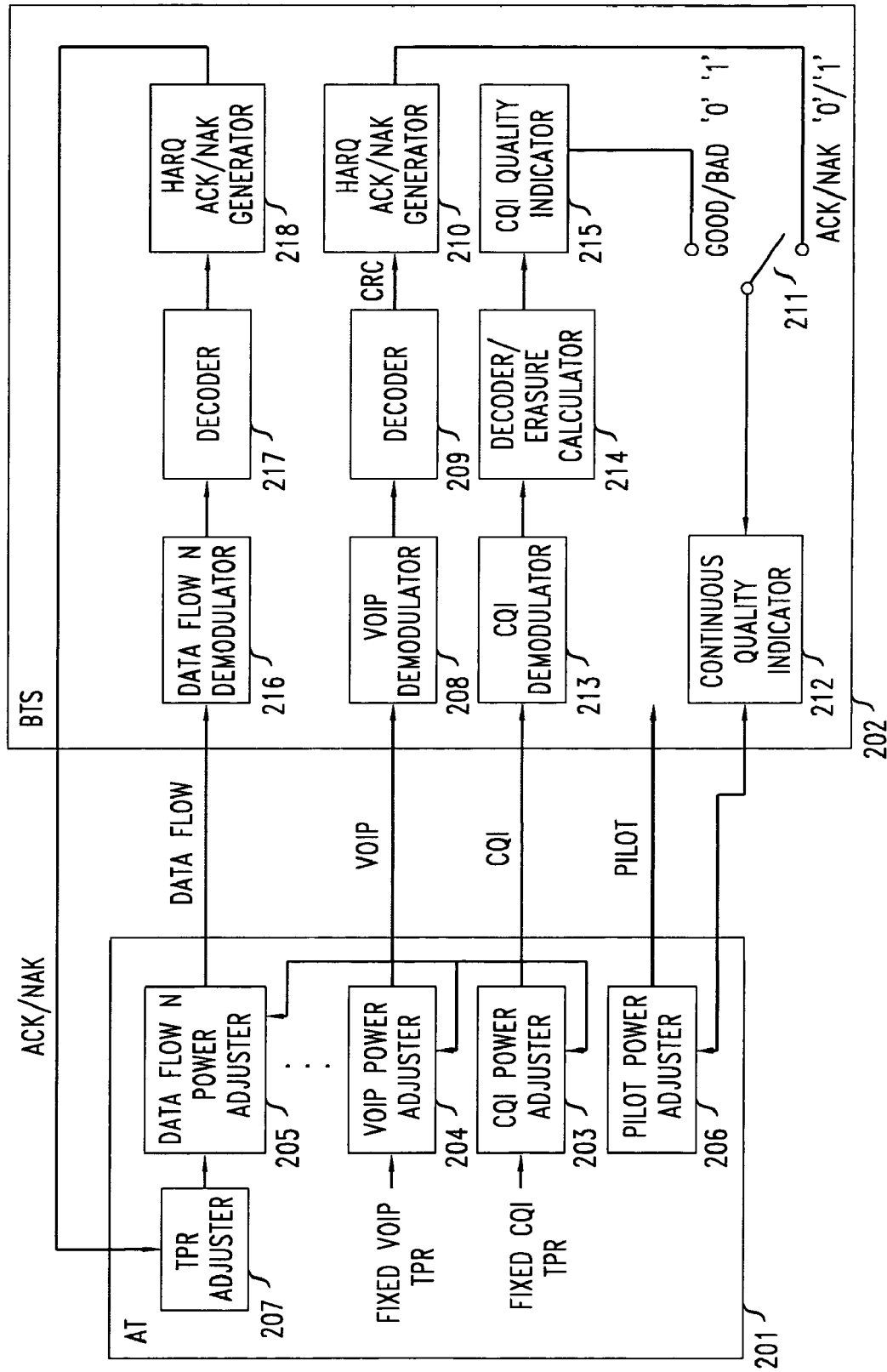
FIG. 2 is a block diagram showing multi-flow dynamic power control based on receiving quality feedback employing embodiments of the present invention.

With reference to FIG. 2, the architecture of a closed loop dynamic power control that is based solely on the feedback of a quality measure is shown. The architecture includes a dynamic power control of the main reference pilot being transmitted by AT 201 that is based on the feedback from the BTS 202 of a continuous quality indication that is derived from the quality of a substantially continuously BTS-received delay-sensitive traffic stream that is transmitted on the RL. Specifically, in this embodiment, the continuous quality indication is the HARQ ACKs/NAKs fed back to AT 201 that are generated at BTS 202 in response to received, demodulated, and decoded packets of VoIP speech data. When a delay-sensitive traffic stream is not being transmitted by AT 201 (and thus not being received by BTS 202), a quality metric derived at the BTS 202 from a continuously received RL overhead channel is fed back to the AT 201 to control the pilot power. Specifically, in this embodiment, "good"/"bad" indications of CQI words received on the overhead channel are fed back to AT 201 to dynamically control the pilot power when there is no VoIP traffic on the RL.

In addition to the above direct control of the main pilot power, the architecture includes a per-flow-based multiple closed-loop power control of the TPR of each independent non-delay-sensitive data flow that is based on the ACKs/NAKs generated from the decoded data stream of that flow and transmitted to AT 201 by BTS 202. The power increases of the AT are also determined by the inter-cell interference of its neighbor cells.

For the RL, it is desired that the main reference AT pilot (e.g., the pilot of CDMA) received at BTS 202 be kept stable, and ideally be kept constant. Channels with a continuous traffic type need a continuous pilot at the BTS for both channel estimation and power control purposes (e.g., for demodulating and decoding the CQI words received on the overhead channel from AT 201, and for demodulating and decoding the packetized VoIP speech signal received from AT 201). A stable main pilot is also needed to provide a good reference for the power control of other burst data traffic flows and for the pilot and traffic of other overlaid air interfaces (e.g., OFDAM overlaid with CDMA and using the CDMA pilot as the main reference pilot).

As noted in FIG. 2, the AT pilot signal is transmitted by AT 201 to BTS 202 where it is used for the described functionalities. Since these functionalities are not relevant to a discussion of the present invention, the component elements within BTS 202 to which the received AT pilot is used to perform these functionalities are not shown in FIG. 2 and the application of the received AT pilot at BTS 202 will not be described further.

At AT 201, the pilot is used to dynamically adjust the power of the CQI transmitted on an RL overhead channel by AT 201 to BTS 202, the transmit power of one or more delay-sensitive data streams, such as a stream of VoIP packets, and the transmit power each of a plurality of other non-delay-sensitive data flows. As can be noted in FIG. 2, at AT 201, the pilot is inputted to CQI power adjuster 203, to VoIP power adjuster 204, and to data-flow-N power adjuster 205. The latter represents the Nth of N different power adjusters (not shown) that individually adjust the power of N different independent non-delay-sensitive data flows. CQI power adjuster 203 dynamically adjusts the transmit CQI power so as to maintain the CQI transmit power at a fixed CQI TPR, which fixed CQI TPR is provided as an input to CQI power adjuster 203. Similarly, VoIP power adjuster 204 dynamically adjusts the transmit VoIP power so as to maintain the VoIP transmit power at a fixed VoIP TPR, which fixed VoIP TPR is provided as an input to VoIP power adjuster 204. The power of the main RL pilot itself is controlled by pilot power adjuster 206, which dynamically adjusts the magnitude of the pilot in accordance with the continuous quality indication that is fed back from BTS 202, as will be described below. As the magnitude of the pilot power is dynamically varied in accordance with the fed back continuous quality indication, both the VoIP transmit power is varied so as to maintain the fixed inputted VoIP TPR and the CQI transmit power is dynamically varied so as to maintain the fixed inputted CQI TPR.

The varying pilot output by pilot power adjuster 206 is also inputted to data-flow-N power adjuster 205 to dynamically control the transmit power of data flow N so as to maintain the TRP of data flow N at its input TPR. The TPR for data flow N, however, is not constant, and itself is dynamically controlled by TPR adjuster 207 in response to a quality feedback from BTS 202 of a quality metric associated with that same demodulated and decoded data flow N as determined at BTS 202 and fed back to TPR adjuster 207 at AT 201. In this embodiment, in each flow the quality metric fed back to TPR adjuster 207 consists of a stream of ACKs/NAKs that are generated at BTS 202 from the CRCs calculated from the sequence of decoded packets in that flow. Thus, as the magnitude of the pilot power is dynamically adjusted up and down in accordance with the continuous quality indication that is fed back to AT 201, the TPR for each of a plurality of data flows is also dynamically adjusted up and down in accordance with a fed back quality indication associated with that data flow.

As noted above, the continuous quality indication that is fed back from BTS 202 to AT 201 that controls the pilot power is derived from a quality indicator associated with the received demodulated and decoded VoIP packetized data stream if such a stream is enabled, or a quality indicator associated with the CQI continuously received on an overhead channel if such a stream is not enabled. At BTS 202, VoIP demodulator 208 demodulates the received stream of packetized VoIP voice data and decoder 209 decodes each packet and calculates a CRC. If the calculated CRC of a packet indicates that the it has been successfully decoded and passes, HARQ ACK/NAK generator 210 generates an ACK (a binary "0"). If the calculated CRC indicates that the packet has not been successfully decoded, HARQ ACK/NAK generator 210 generates a NAK (a binary "1"). While the quality of the received delay-sensitive VoIP voice stream is being determined, the CQI being continuously received on the RL overhead channel is being demodulated by CQI demodulator 213. Each demodulated CQI word is decoded and determined to be "good" or "bad" (an erasure) by decoder/erasure calculator 214. CQI quality indicator 215 outputs a binary "0"if a CQI word is determined to be "good" and a binary "1" if a CQI is determined to be "bad". As long as transmission of a VoIP stream (or another substantially continuous delay-sensitive traffic stream such as VT) is actively enabled such that the received stream can be demodulated and decoded to produce a stream of ACK/NAK quality indicators, switch 211 gates the generated ACK/NAK indicators to continuous quality indicator 212 for transmission on the FL to AT 201. If transmission of such a substantially continuous delay-sensitive traffic stream is not enabled, switch 211 gates the generated CQI "good"/"bad" indicators to continuous quality indicator 212. Continuous quality indicator 212 is thus continuously transmitting feedback associated with the quality of the signals being received by BTS 202 from AT 201. As described above, this feedback to AT 201 is used to dynamically adjust its pilot power up and down, and thus from it the transmit powers of its RL signals.

At AT 201, pilot power up/down adjustments can be taken at every sub-frame or at the termination target. For the latter, action is only taken after the maximum number of transmissions of a packet has failed (i.e., it only responds after the last NAK), or an earlier received transmission that has been successfully decoded and an ACK sent. For the former, an up/down power adjustment is made in response to each received ACK/NAK associated with the VoIP stream, or each received "good"/"bad" CQI indicator. When the VoIP flow is enabled and a NAK is received by AT 201, the pilot power is adjusted upward by a predetermined step in dB that is determined by a desired VoIP Frame Error Rate (FER) and throughput performance. When tracking VoIP as a target, the up steps could be different for the first retransmission, the second retransmission, etc., up to the retransmission at the termination target. When an ACK is received, the pilot power is adjusted downward. If an ACK is received before or at the termination target (i.e., the sub-frame is eventually successfully received by BTS 202), the new pilot level is set to be equal to the pilot level of the first transmission of the sub-frame minus a target-down-delta that is determined by the desired FER. The FER target level also determines the ratio of accumulated up-steps at the terminal target to the target-down-delta. As noted, when the VoIP flow is disabled, the CQI quality indicators are used to control the pilot power. A "bad" quality indication causes the pilot power to be adjusted up a predetermined step and a "good" quality indicator causes the pilot power to be adjusted downward, where the up and down steps are determined by the CQI quality target (i.e., a CQI word error rate). Regardless of whether the CQI quality or the VoIP quality is driving the up and down pilot power excursions, an upper and lower limit is imposed on the pilot level. Further, when required up or down steps are large, the pilot power adjustment could be smoothed over a period of time.

Figure 3:
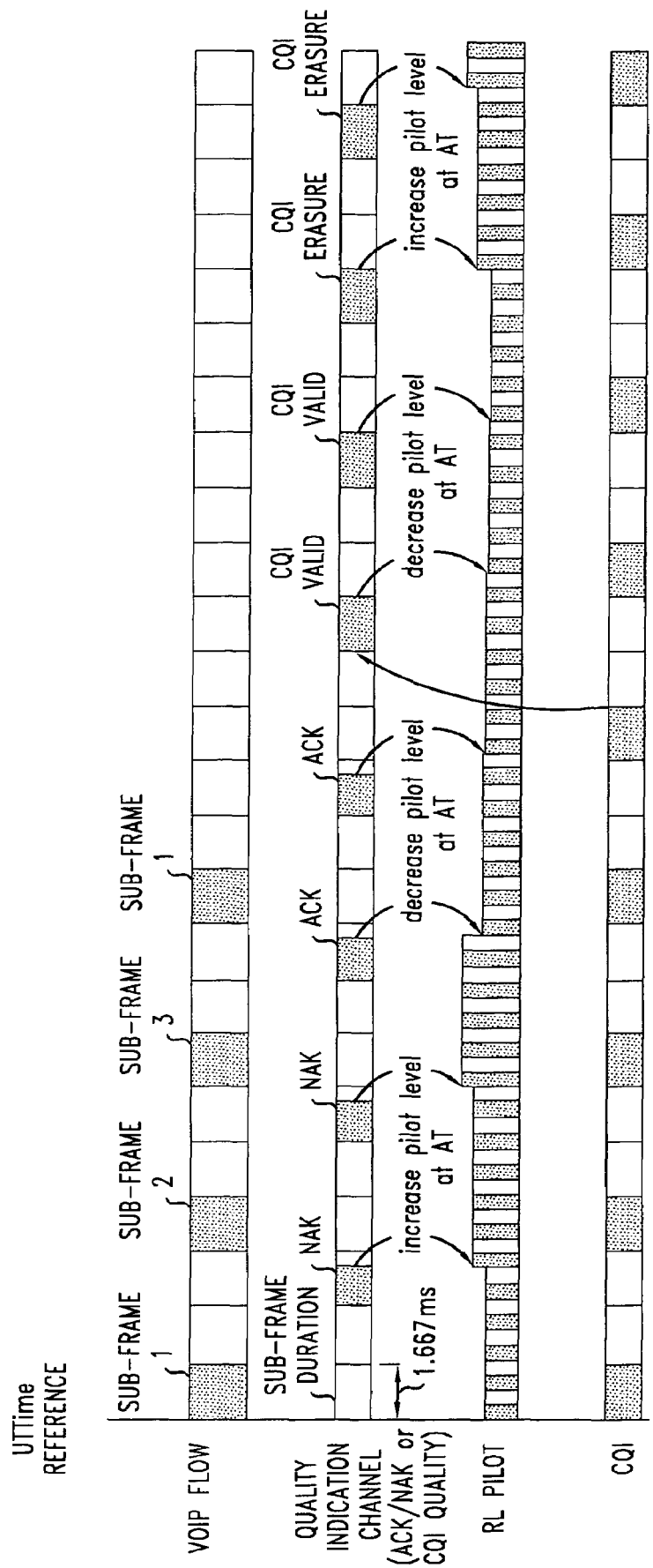

FIG. 3 is a set of timing diagrams that illustrate the relationships between a VoIP flow transmitted by AT 201, the feedback quality indication channel received by AT 201 on the FL from BTS 202, the magnitude of the RL pilot level at AT 201, and the CQI words transmitted by AT 201 to BTS 202. In these diagrams, it is assumed that a pilot power level up/down action is taken at every sub-frame rather than at the termination target. As can be noted, after sub-frame1 is transmitted in the VoIP flow, it is unsuccessfully decoded and a NAK is generated and received by AT 201 on the quality indication channel, thereby causing an increase in the RL pilot level at the AT. Since that NAK also causes a retransmission of that packet, it is retransmitted (sub-frame2), which illustratively is shown again as being unsuccessfully decoded. Thus a NAK is fed back on the quality indication channel, thereby causing a further increase in the RL pilot level at the AT. The second retransmission (third transmission) of the packet (sub-frame3) is shown as being successfully decoded by BTS 202. AT 201 now receives an ACK on the channel indication channel, thereby effecting a decrease in the RL pilot level at the AT, as is shown. A new packet in the VoIP flow is then transmitted (noted as sub-frame 1), which is successfully decoded on its initial transmission. An ACK is again received by AT 201 on the quality indication channel, thereby causing a further decrease in the RL pilot level. The VoIP flow is then shown as being disabled. The determined qualities of the received CQIs, which are continuously being transmitted on the FL by AT 201 are then used to provide a continuous quality indication feedback to the AT for purposes of dynamic power control. CQI quality indicators are then transmitted on the quality indication channel. As can be noted, the next CQI received by BTS 202 is determined to be "good" and an indication that a valid CQI has been decoded is received by AT 201 on the quality indication channel. This causes AT 201 to further decrease its RL pilot level. The VoIP flow continues to remain disabled and the next CQI is again determined to be "good". A received "good" CQI indicator on the quality indication channel causes AT 201 to further decrease its RL pilot level. With the VoIP flow still disabled, the next two CQIs received by the BTS 202 are illustratively shown as being in error and AT 201 receives "bad" CQI indicators on the quality indication channel. In response to each, AT 201 is shown to increase its RL pilot level.

Figure 4:
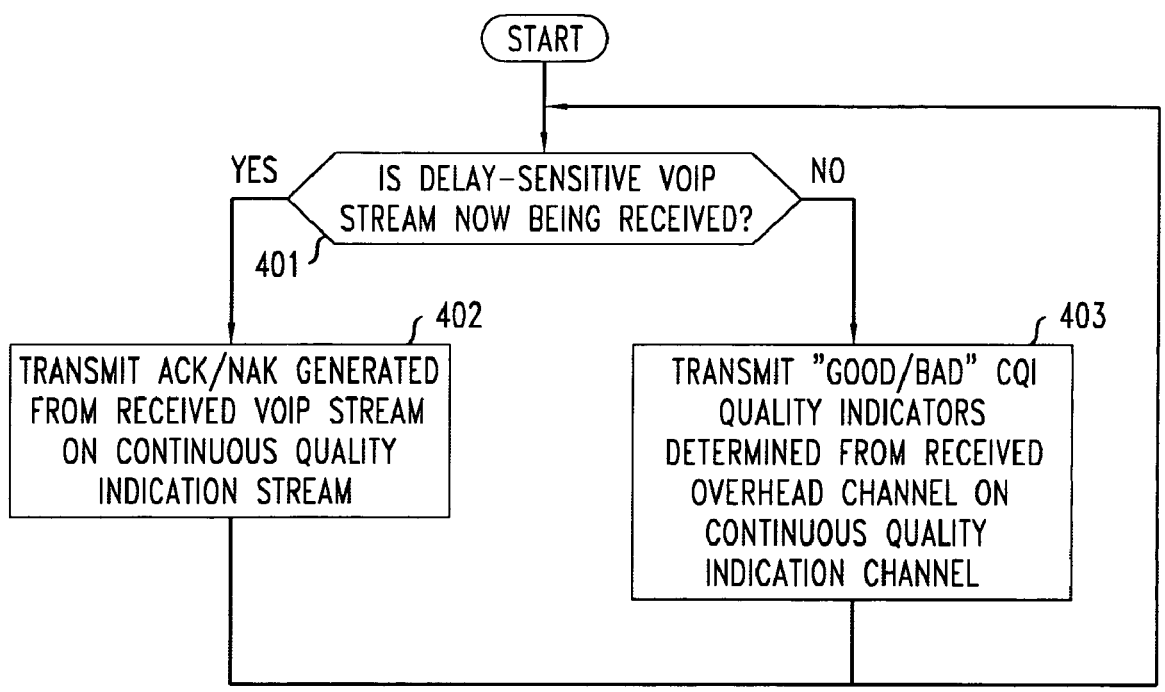
FIG. 4 is a flowchart showing the steps at a BTS in transmitting a continuous quality indication that is derived from the determined quality of a received delay-sensitive traffic stream, such as VoIP, when such a delay-sensitive traffic stream is enabled, or when such a stream is not enabled, that is derived from the determined quality of a continuously received overhead channel, such as the CQI words transmitted by the AT on the RL.

FIG. 4 is a flowchart showing the steps at BTS 202 for transmitting a continuous quality indication derived from the quality of a received delay-sensitive conversational VoIP traffic stream when such a traffic stream is enabled and being received, and from the quality of a continuously received overhead channel, such as the CQI transmitted by the AT 201 on the RL, when a delay-sensitive traffic stream is not enabled. Thus, at step 401, a determination is made whether BTS 202 is presently receiving the delay-sensitive VoIP stream. If it is, then, at step 402, the ACKs/NAKs generated from that received demodulated and decoded stream are transmitted on the continuous quality indication channel on the FL to AT 201. If BTS 202 is not receiving a delay-sensitive VoIP stream, then, at step 403, the "good"/"bad" CQI quality indicators determined from the received demodulated and decoded overhead channel are transmitted on the FL to AT 201 on the continuous quality indication channel.

Figure 5:
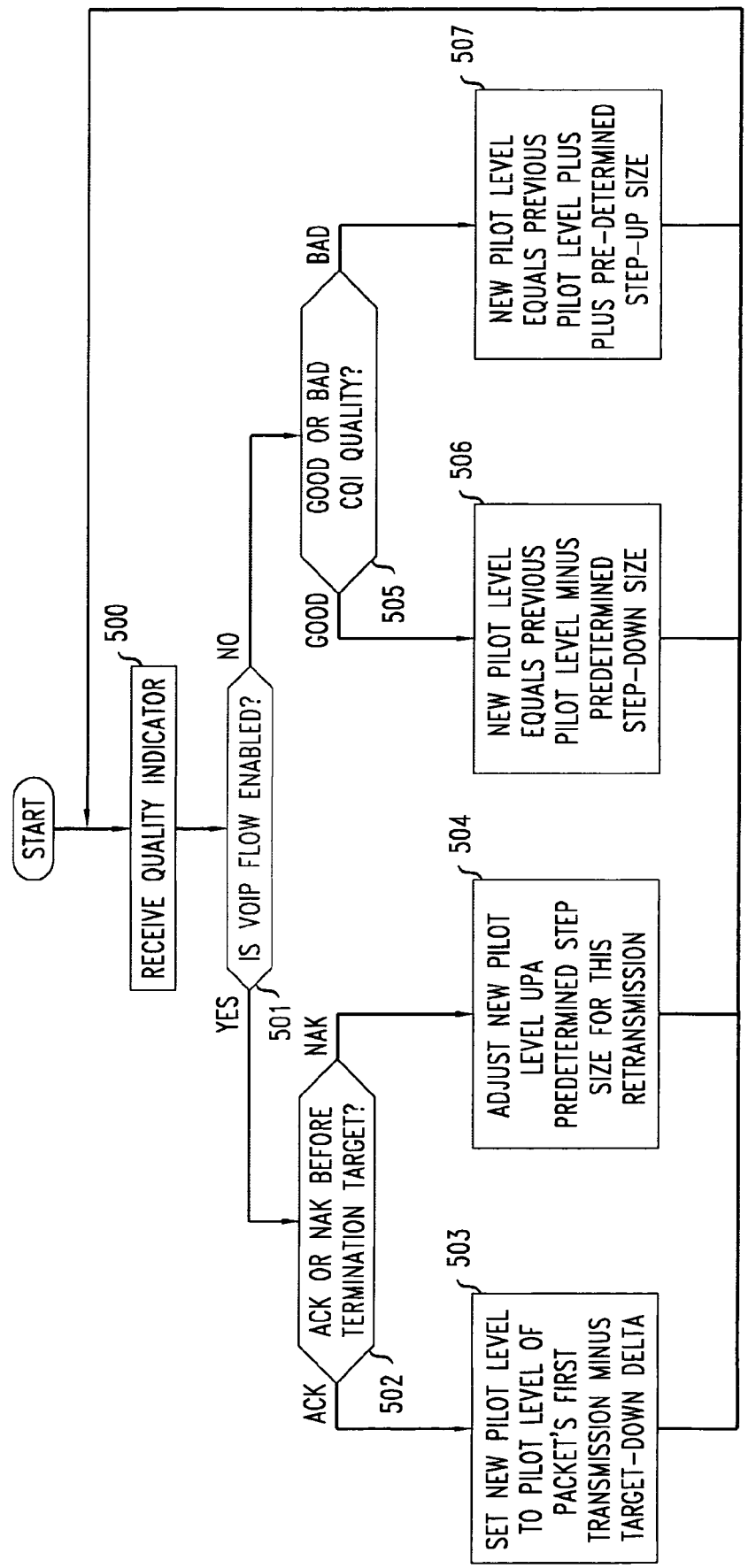
FIG. 5 is a flowchart showing the main power control steps at an AT that are performed in response to the received continuous quality indication from the BTS.

FIG. 5 is a flowchart showing the main power control steps at AT 201 that are performed in response to the fed back quality indicators received over the continuous quality indication channel on the FL. At step 500, a quality indicator is received over the continuous quality indication channel from BTS 202. At step 501 a determination is made whether the VoIP flow is enabled in the FL. If it is, then the quality indicators being received over the continuous quality indication channel are associated with the VoIP stream. Thus, if a determination is made that the VoIP flow is enabled, a determination is made, at step 502, whether an ACK or NAK has been received before or at the termination target. If an ACK is received, at step 503, a new pilot level is set at the pilot level of the first transmission of the packet minus a target-down-delta. If a NAK is received, at step 504, the pilot power is adjusted up with a predetermined step size for this particular retransmission. If, at step 501, a determination is made that the VoIP stream is not enabled, then the received quality indicators are indicators of whether the CQI is "good" or "bad." If, at step 505, a determination is made that the received quality indication is "good", then, at step 506, a new pilot level is set at the previous pilot level minus a predetermined step-down size. If, however, at step 505, a determination is made that the received quality indication is "bad", then, at step 507, a new pilot level is set at the previous pilot level plus a predetermined step-up size.

As previously described, since each non-delay-sensitive data flow of an application is also supported by HARQ, each flow is able to have its own closed-loop power control based on its own ACK/NAK and quality target. Whereas, as described, the main pilot power control is used to adjust the transmit power of each of a plurality of such non-delay-sensitive data streams, per flow based power control is used to adjust the TPR for each flow by targeting on the quality requirement of the specific application of the flow. With reference again to FIG. 2, for the exemplary data flow N, at BTS 202, the received data stream N is demodulated by data-flow-N demodulator 216 and decoded by decoder 217. The CRC of each frame is calculated and HARQ ACK/NAK generator 218 outputs an ACK when the CRC passes and a NAK when the CRC fails. The generated ACKs and NAKs are fed back on the FL to TPR adjuster 207 in AT 201 for power control. Similar but independent demodulation, decoding and feedback is performed on each of the other non-delay-sensitive data flows between AT 201 and BTS 202, and the TPR associated with each is independently controlled by each flow's own generated ACK/NAK feedback. For each data flow, closed loop power control is effected by adjusting the TPR associated with that flow based on the received ACKs/NAKs as follows: when the AT receives a NAK at its termination target, the TPR is adjusted upward by a predetermined step in dB based on the quality target and throughput performance for that flow; when an ACK is received before or at termination target, the AT adjusts the FER downward (normally with a much smaller step size) based on the target FER. Different flows can have different up and down step sizes, with their ratio determined by the quality target of the application of the flow. Different flows can have different upper and lower limits of their TPR.

As compared with the power control of the main pilot, the closed loop power control effected by adjusting the TPR of each flow could be relatively slow. Adjustments of the main pilot and the TPR of each flow are preferably coordinated. An example of a possible rule for coordinating both adjustments is that when multiple requests for an up adjustment (both pilot level and TPR) occur at the same time, the AT will adjust the main pilot level upward and not also adjust the TPR upward, or adjust the latter with a smaller step size would otherwise be used for an upward TPR adjustment in the presence of a downward pilot adjustment. A slow power step down drifting of pilot level and TPR can be conducted independently since the power downward step size is generally much smaller than a power-up adjustment. Thus, both the pilot and TPR can both be adjusted independently.

Figure 6:
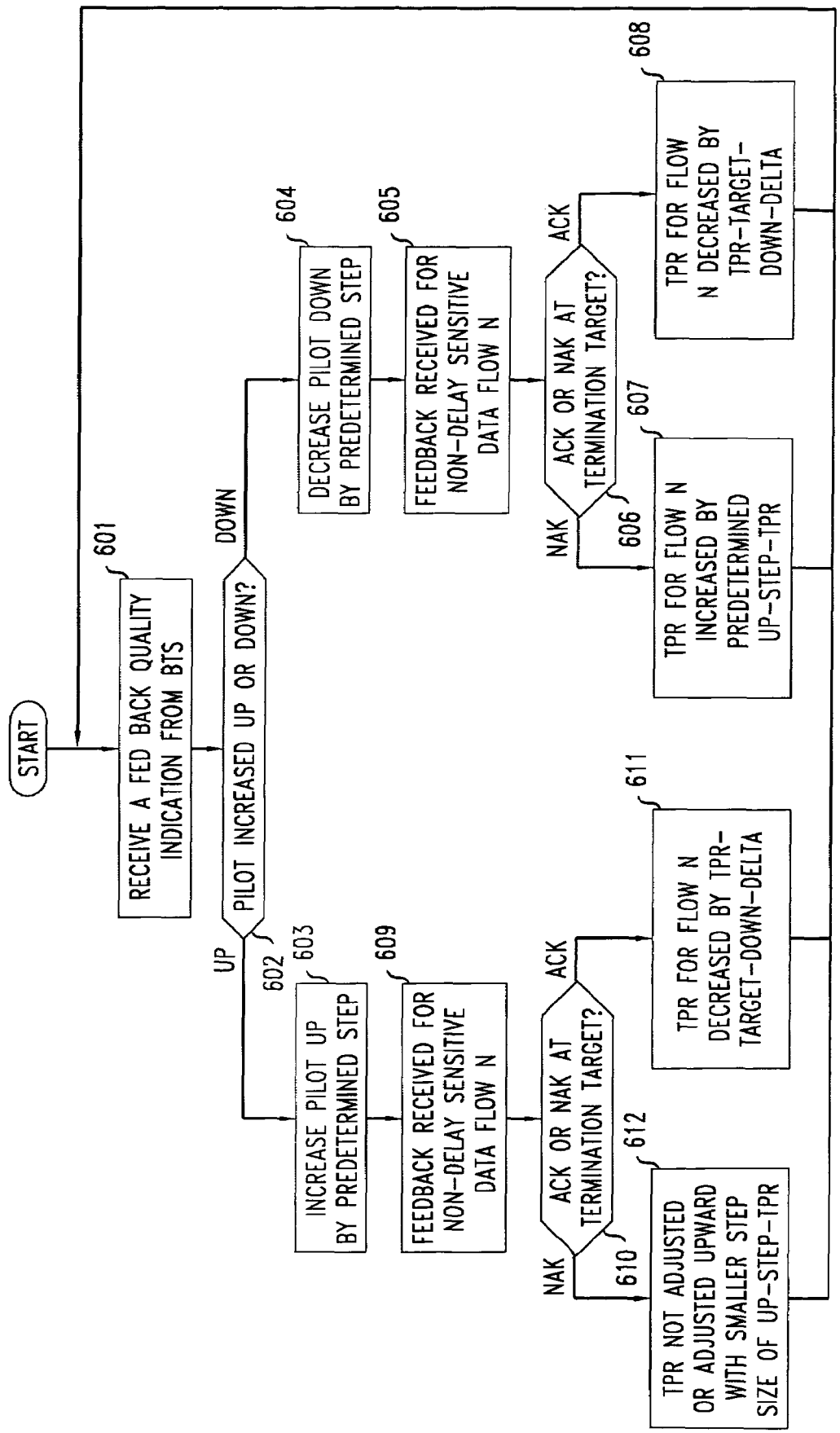
FIG. 6 is a flowchart showing the power control steps at an AT for adjusting the pilot power in response to a feedback quality indication of a delay-sensitive traffic stream in conjunction with TPR adjustments for non-delay-sensitive data flows in response to independent fed back quality indications associated with such flows.

FIG. 6 is a flowchart showing the dynamic power control steps for adjusting the pilot power in response to a fed back quality indication of a delay-sensitive traffic stream in conjunction with dynamic TPR adjustments for non-delay-sensitive data flows in response to independent fed back quality indications associated with such flows. At step 601, AT 201 receives a fed back quality indication. At step 602, a determination is made whether the pilot should be increased up or decreased down. If the determination is up, at step 603, the main pilot power is increased by predetermined step (as previously discussed). If the determination is down, at step 604, the main pilot power is decreased a predetermined step (as previously discussed). If coincident with the receipt of a pilot step-down determination, a fed back quality indication for non-delay-sensitive data flow N is also received (at step 605), then a determination is made, at step 606, whether the received indication is an ACK or NAK. If a NAK is received, then, at step 607, the TPR associated with data flow N is increased by a predetermined step (up-step-TPR) contemporaneously with the pilot step down. If an ACK is received, then, at step 608, the TPR associated with data flow N is decreased by a predetermined step (target-down-delta) contemporaneously with the pilot step down. If coincident with the receipt of a pilot step up determination, a fed back quality indication for non-delay-sensitive data flow N is also received (at step 609), then a determination is made, at step 610, whether the received indication is an ACK or NAK. If the received indication is an ACK, then, at step 611, the TPR is adjusted downward contemporaneously with the pilot step up. If, however, the received indication is a NAK, then, at step 612, either the TPR is not adjusted at all while the pilot is adjusted up, or it is adjusted up with a smaller step size than used when adjusting it upward contemporaneously with a downward pilot adjustment, as is used in step 607. Such TRP controls are independently applied to each of the N data flows being transmitted from AT 201 to BTS 202.

Per flow-based closed loop power control can be applied to any system with any interface as long a per flow-based HARQ is supported. Each Radio Link Protocol (RLP) flow will have an independent HARQ with associated ACK/NAK. In an overlaid air interface, which is being proposed for the RevC standard (for example, CDMA overlaid with OFDMA), the pilot in the CDMA system could be the main pilot, as described above, which not only supports the burst traffic in the CDMA air interface but is also used as a reference to generate the pilot of the OFDMA system. The power control mechanism thus needs to be efficiently integrated together for both air interfaces. The TPR could be in the same air interface, for example, it could be either in the CDMA air interface or it could be the TPR of an OFDMA traffic flow vs. the OFDMA pilot. In the case of a system of overlaid air interfaces each air interface can have its own pilot where one pilot can be derived from the other. The TPR will be conducted separately in its own air interface. If the overlaid CDMA system has Interference Cancellation, a better approach it to take the main pilot (in a real system, the pilot measure is always it SNR) after interference cancellation as a reference from which to generate the OFDMA pilot. The relation of the OFDMA pilot to the CDMA main pilot could be determined by a ratio parameter (Gamma factor). A relatively stable OFDMA pilot is desired. The Gamma factor could be dynamically adjusted based on the long-term aggregated quality target of the OFDMA system.

An AT should not only listen to its serving sector's Reverse Activity Bits (RABs) being transmitted by the BTS for overload control purposes (normally used for CDMA), but should also listen to the outer-of-cell Interference Activity Bits (IABs) transmitted by the BTS in its neighbor cell (for OFDMA). The per flow-based power upper limit of an application flow for a given rate should be driven by the IABs (or RABS) transmitted by the neighbor cells and the distance of the AT to those neighbor cells and based on that flow's QoS desired requirement. For a user at a cell edge, the transmission power upper limit should be lower than the upper limit of a different user/application flow in the central area of the cell.

The above-described embodiments are illustrative of the principles of the present invention. Those skilled in the art could devise other embodiments without departing from the spirit and scope of the present invention.

The invention claimed is:

1. A method in a wireless communication system in which an access terminal (AT) communicates with a base transceiver station (BTS) over a reverse link (RL) and a forward link (FL), the method comprising:
   at the AT:
   if a delay-sensitive traffic stream is enabled on the RL, dynamically controlling the power of a main RL pilot in response to a quality indication feedback received on the FL of the delay-sensitive traffic stream received by the BTS; and
   if a delay-sensitive traffic stream is not enabled on the RL, dynamically controlling the power of the main RL pilot in response to a quality indication feedback received on the FL of a signal continuously transmitted on the RL on an overhead channel.

2. The method of claim 1 wherein the delay-sensitive traffic stream is a stream of delay-sensitive packets.

3. The method of claim 2 wherein the quality indication feedback of the delay-sensitive packets is a stream of ACKs and NAKs generated at the BTS in response to the received stream of packets.

4. The method of claim 3 wherein the stream of delay-sensitive packets is a stream of Voice-over-IP (VoIP) packets.

5. The method of claim 3 wherein the stream of delay-sensitive packets is a stream of Video Telephony (VT) packets.

6. The method of claim 3 further comprising:
if a NAK is received, adjusting the pilot power by a predetermined step upward; and
if an ACK is received, adjusting the pilot power by a predetermined step downward.

7. The method of claim 6 wherein the steps upward and downward are determined by a predetermined frame error rate of the delay-sensitive traffic stream and a desired throughput performance.

8. The method of claim 6 wherein if a NAK is received, the predetermined step upward is dependent on how many times a packet that the NAK is responsive to has been transmitted to the BTS by the AT.

9. The method of claim 6 wherein if the ACK is received before or at a termination target, the pilot level is set equal to the pilot level used when a first transmission of the packet to which the ACK is responsive was made by the AT minus a predetermined target-down-delta that is determined by a predetermined frame error rate.

10. The method of claim 1 wherein the signal continuously transmitted on the overhead channel on the RL comprises a stream of Channel Quality Indicator (CQI) words.

11. The method of claim 10 wherein the quality indication feedback of the stream of CQI words comprises a stream that indicates whether the received CQI words are "good" or "bad".

12. The method of claim 11 further comprising:
if a "good" quality indication feedback is received, adjusting the pilot power by a predetermined step downward; and
If a "bad" quality indication feedback is received, adjusted the pilot power by a predetermined step upward.

13. The method of claim 12 wherein the predetermined steps upward and downward are determined by a CQI quality target.

14. The method of claim 1 wherein the pilot has predetermined upper limit a lower limits.

15. A method in a wireless communication system in which an access terminal (AT) communicates with a base transceiver station (BTS) over a reverse link (RL) and a forward link (FL), the method comprising:
at the BTS:
transmitting a quality indication on the FL wherein if a delay-sensitive traffic stream is enabled on the RL, the quality indication comprises a determined quality of a packet in a delay-sensitive traffic stream received from the AT, and if the delay-sensitive traffic stream is not enabled on the RL, the quality indication comprises a determined quality of a word in a stream of words continuously received from the AT on the RL on an overhead channel.

16. The method of claim 15 wherein the delay-sensitive traffic stream is a stream of delay-sensitive packets.

17. The method of claim 16 wherein the determined quality of the packet in the received stream of delay-sensitive traffic comprises an ACK if the packet is properly decoded and a NAK if a packet is not properly decoded.

18. The method of claim 15 wherein the word received from the AT on the overhead channel is a Channel Quality Indicator (CQI) word.

19. The method of claim 18 wherein the determined quality of the CQI comprises a "good" indication if the received CQI word is properly decoded and a "bad" indication if the received CQI word is improperly decoded.

* * * * *